US010994209B2

(12) United States Patent
Miyaki

(10) Patent No.: US 10,994,209 B2
(45) Date of Patent: May 4, 2021

(54) SHADOW BANNING IN SOCIAL VR SETTING

(71) Applicant: Sony Interactive Entertainment America LLC, San Mateo, CA (US)

(72) Inventor: Ken Miyaki, San Diego, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 117 days.

(21) Appl. No.: 15/823,335

(22) Filed: Nov. 27, 2017

(65) Prior Publication Data

US 2019/0160382 A1 May 30, 2019

(51) Int. Cl.
| | |
|---|---|
| A63F 13/75 | (2014.01) |
| A63F 13/211 | (2014.01) |
| A63F 13/212 | (2014.01) |
| A63F 13/25 | (2014.01) |
| A63F 13/5255 | (2014.01) |
| G06F 3/01 | (2006.01) |
| G06Q 50/00 | (2012.01) |
| H04L 12/58 | (2006.01) |
| G06F 40/30 | (2020.01) |

(52) U.S. Cl.
CPC ............ *A63F 13/75* (2014.09); *A63F 13/211* (2014.09); *A63F 13/212* (2014.09); *A63F 13/25* (2014.09); *A63F 13/5255* (2014.09); *G06F 3/011* (2013.01); *G06F 3/013* (2013.01); *G06F 3/017* (2013.01); *G06F 40/30* (2020.01); *G06Q 50/01* (2013.01); *H04L 51/12* (2013.01); *A63F 2300/5586* (2013.01); *A63F 2300/8082* (2013.01)

(58) Field of Classification Search
CPC .... A63F 13/75; G06F 11/3438; G06F 21/316; G06F 3/011; G06F 3/013; G06F 3/017; G06Q 30/0248; G06Q 50/01; G06Q 50/265; H04L 63/14
See application file for complete search history.

(56) References Cited

U.S. PATENT DOCUMENTS

| | | | |
|---|---|---|---|
| 2009/0141023 A1 | 6/2009 | Shuster | |
| 2009/0150801 A1 | 6/2009 | Grigsby et al. | |
| 2009/0177979 A1 | 7/2009 | Garbow et al. | |
| 2018/0131788 A1* | 5/2018 | Roberts | G06F 3/04815 |

OTHER PUBLICATIONS

International Search Report and Written Opinion of International Patent Application No. PCT/US2018/061488 dated Feb. 5, 2019 in 7 pages.

\* cited by examiner

*Primary Examiner* — William H McCulloch, Jr.
*Assistant Examiner* — Ankit B Doshi
(74) *Attorney, Agent, or Firm* — Procopio, Cory, Hargreaves & Savitch LLP

(57) ABSTRACT

Shadow banning a participant within a social VR system includes: receiving and forwarding an identity of the participant, who may be shadow banned; recognizing and tracking inappropriate behaviors including inappropriate language and comments, inappropriate gestures, and inappropriate movements; receiving and processing the recognized and tracked inappropriate behaviors of the participant; generating a safety rating based on the processed inappropriate behaviors; comparing the safety rating to a threshold value; and outputting a signal to label the participant as a griefer and shadow ban the griefer when the safety rating is greater than the threshold value.

19 Claims, 4 Drawing Sheets

SHADOW BANNING IN SOCIAL VR SETTING

BACKGROUND

Field of the Invention

The present disclosure relates to shadow banning, and more specifically, to shadow banning in a social VR setting.

Background

Virtual reality (VR) interactions through networked services can give rise to new and delightful experiences for participants. In particular, social VR interactions and/or systems have an immense potential for presence, which magnifies the good and the bad experiences. The bad experiences may include being harassed or grieved in the social VR interactions by "griefers" who use inappropriate language, gestures, and movements. Ignoring and/or confronting the griefers may just increase rather than alleviate the bad experiences.

SUMMARY

Implementations of the present disclosure provide for "shadow" banning griefers in the setting of the social VR system through analysis of implicit social interactions and natural language processing.

In one implementation, a method for shadow banning a participant within a social VR system is disclosed. The method includes: receiving and forwarding an identity of the participant, who may be shadow banned; recognizing and tracking inappropriate behaviors including inappropriate language and comments, inappropriate gestures, and inappropriate movements; receiving and processing the recognized and tracked inappropriate behaviors of the participant; generating a safety rating based on the processed inappropriate behaviors; comparing the safety rating to a threshold value; and outputting a signal to label the participant as a griefer and shadow ban the griefer when the safety rating is greater than the threshold value.

In another implementation, a system for shadow banning a target participant within a social VR system is disclosed. The system includes: at least one recognition and tracking unit configured to recognize and track inappropriate behaviors including inappropriate language and comments, inappropriate gestures, and inappropriate movements; a processor configured to receive and forward an identity of the participant, who may be shadow banned, to the at least one recognition and tracking unit, the processor also configured to receive and process the recognized and tracked inappropriate behaviors of the target participant, the processor further configured to generate a safety rating based on the processed inappropriate behaviors, compare the safety rating to a threshold value, and output a signal to label the target participant as a griefer and shadow ban the griefer when the safety rating is greater than the threshold value.

In yet another implementation, a non-transitory computer-readable storage medium storing a computer program to shadow ban a participant within a social VR system is disclosed. The computer program includes executable instructions that cause a computer to: receive and forward an identity of the participant, who may be shadow banned; recognize and track inappropriate behaviors including inappropriate language and comments, inappropriate gestures, and inappropriate movements; receive and process the recognized and tracked inappropriate behaviors of the participant; generate a safety rating based on the processed inappropriate behaviors; compare the safety rating to a threshold value; and output a signal to label the participant as a griefer and shadow ban the griefer when the safety rating is greater than the threshold value.

Other features and advantages of the present disclosure will become more readily apparent to those of ordinary skill in the art after reviewing the following detailed description and accompanying drawings.

DETAILED DESCRIPTION

Figure 1:
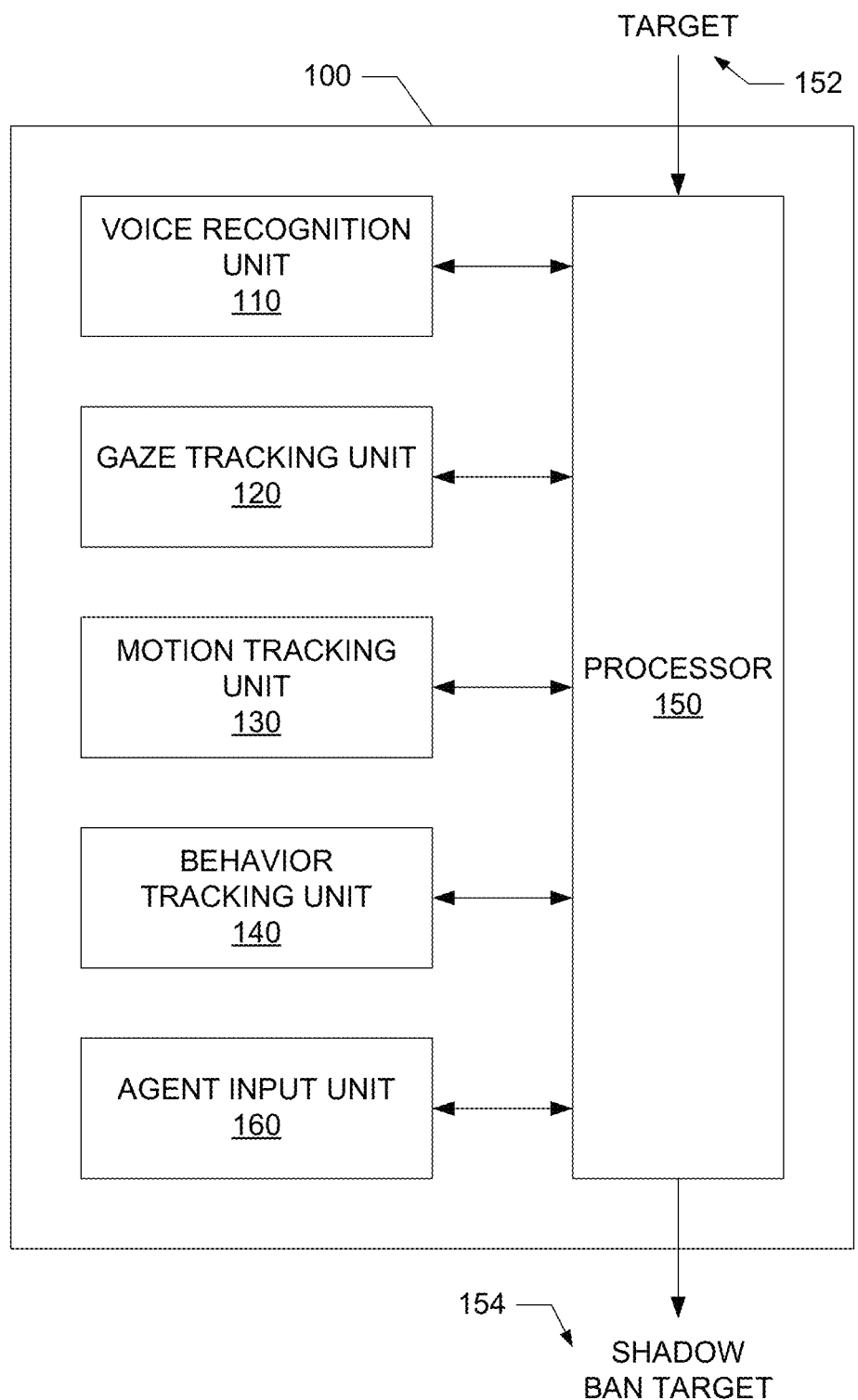
FIG. 1 is a block diagram showing a shadow banning block of a social VR is system in accordance with one implementation of the present disclosure.

As stated above, the conventional social VR interactions and/or systems may result in bad experiences due to the presence of griefers. Thus, by implementing the social VR interactions and/or systems that can effectively block out the presence of griefers, the present disclosure describes a significant technological improvement over the conventional social VR interactions and/or systems.

After reading this description it will become apparent how to implement the present disclosure in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present disclosure.

To achieve the goal of the significant technological improvement over the conventional social VR systems, implementations of the social VR interactions and/or systems of the present disclosure as disclosed herein provide for "shadow" banning griefers in the setting of the social VR system through analysis of implicit social interactions and natural language processing. The term "shadow" banning, as used in the context of the social VR interactions and systems of the present disclosure, refers to making the target of the ban (e.g., an avatar of a griefer) "not appear" to a particular person or group of people so that the particular person or group of people does not interact with the target of the ban (i.e., the griefer). The term "not appear" includes being invisible, inaudible, and/or otherwise not sensible in the social VR system.

Accordingly, in one implementation, the present disclosure describes a concept of shadow banning the griefers who are identified by data analysis. For example, the data analysis may include implicitly tracking use of at least one of: (1)

inappropriate language (e.g., profanity, racial slurs, etc.) using voice recognition; (2) inappropriate gestures (e.g., inappropriate gaze, hand signs, etc.) using gaze tracking; and (3) inappropriate movements (e.g., standing too close, unwanted touching, etc.) using motion tracking. In other implementations, the use of inappropriate language, inappropriate gestures, and inappropriate movements can be tracked using methods other than voice recognition, gaze tracking, and motion tracking. For example, these behaviors can be tracked by tracking the responses of the people being grieved by the griefers, in addition to the voice recognition, gaze tracking, and motion tracking. For example, the responses of the people being grieved may include utterances such as "stop it," "what are you looking at," and "I am going to report you."

In one implementation, a targeted participant of the VR interactions is given a "safety" rating based on the participant's behavior (e.g., the participant's use of language, gestures, and movements) during the VR interactions, which include at least one event. For each event, the targeted participant is scored based on inappropriate behaviors of the participant or explicit response (e.g., "stop it") from the person being harassed or grieved. For example, the participant may be assessed 1 point for staring at other participant's anatomy, but may be assessed 10 points for groping. In another example, the use of foul language may add 5 points, while the use of racial slur may add 20 points to the participant's score. At the end of each event, the participant's total score for that event may be added to the safety rating of the participant (e.g., a total score for all events) and compared against a threshold. Once the total score or the safety rating of the participant passes a threshold, the participant may be shadow banned. In other implementations, the participant is shadow banned immediately upon reaching the threshold without waiting until the end of the event. The effectiveness of the shadow banning is high because the griefer does not realize that the griefer is being shadow banned. However, once the griefer realizes that he or she is being shadow banned, the griefer may take evasive actions such as logging out and logging back in using a new account to continue the griefing action.

In one implementation, the shadow banning of the griefer may apply to a particular person (e.g., if the griefing has been directed against that particular person) or to a group of people (e.g., if the griefing has been directed against the group or the griefing was so severe that it affected people other than the particular person). In other implementations, even if the griefing was against only one person, the griefer may be shadow banned against everyone in an event, if the safety rating of the griefer is relatively high (e.g., double the threshold).

In one implementation, the social VR interactions/experiences may have at least one enforcement agent (e.g., acting as an undercover agent) to determine whether the safety rating has been correctly applied or has not been abused. The enforcement agent may also act as a "judge" when the griefer or the person being grieved appeals the assessed scores. Thus, the agent may discourage the participants from using the false reporting of griefing as a tool for vendetta or attacking an opponent or group of opponents within the social VR setting.

In one implementation, shadow banning participants based on the participant's safety rating may lower the friction for reporting griefers because the griefers do not get an immediate feedback that they are being shadow banned. Once the griefer realizes that he or she is being shadow banned, the griefer may take evasive actions such as logging out and logging in using a new account to continue the griefing action. Thus, shadow banning a participant may work effectively for a limited time while the participant does not realize that he or she is being shadow banned. To counter this, in one implementation, once it has been determined that the griefer knows or realizes that he or she has been shadow banned, the griefer's account may be permanently banned from participating in further events of the social VR interactions and/or systems. In another implementation, once it has been determined that the griefer is taking evasive actions because the griefer knows or realizes that he or she has been shadow banned, the shadow banning application can notify the manager of the social VR interactions and/or systems to target and ban a particular machine or Internet Protocol (IP) address from entering the events of the social VR interactions and/or systems. In one implementation, the particular machine includes a computer, game console, or head-mounted display (HMD). Thus, in this implementation, the particular machine can be banned based on an identifier for the particular machine such as the head-mounted display.

One example scenario of the implementation described above (which includes the reporting of the griefer) may involve following steps: (a) a participant is involved in a sporting activity such as a table tennis (in the VR social space) with a friend and is completely focused on the activity; (b) a griefer comes into the participant's space from a blind spot and grieves the participant; (c) at some point, the participant notices or senses the grieving action by the griefer; (d) the participant stops the sporting activity with the friend in the VR social space; (e) the participant presses an option button to bring up a menu to "Report a person for inappropriate behavior"; (f) the participant goes through a series of selection dialogues including a dialogue such as "Choose the person who is griefing you"; (g) confirm the entry; (h) wait for the grief reporting that the griefer is blocked from the view; and (i) the participant goes back to the sporting activity.

In another implementation, the shadow banning of a griefer may not involve reporting the griefer by the participant being grieved by the griefer, which may be an improvement over the previous implementation in which the participant needs to report the griefer. For example, this implementation (which does not include the reporting of the griefer) may involve following steps: (a) a participant is involved in a sporting activity such as a table tennis (in the VR social space) with a friend and is completely focused on the activity; (b) a griefer comes into the participant's space from a blind spot and grieves the participant; (c) the system detects the unwanted grieving action, based on the special proximity, eye tracking, and other heuristics, and the griefing score is found to exceed the threshold; (d) once the griefing score exceeds the threshold, the griefer is shadow banned (the griefer may keep on doing what the griefer was doing, but is gone from the view of the participant without the participant even noticing that the griefer was there); and (e) the participant enjoys the sporting activity uninterrupted. In one implementation, the reporting option in the VR social space may be adjustable by the participant.

FIG. 1 is a block diagram showing a shadow banning block 100 of a social VR system in accordance with one implementation of the present disclosure. In one implementation, the shadow banning block 100 is a system configured entirely with hardware including one or more digital signal processors (DSPs), general purpose microprocessors, application specific integrated circuits (ASICs), field programmable logic arrays (FPGAs), or other equivalent integrated or discrete logic circuitry. In another implementation, the shadow banning block 100 is configured with a combination of hardware and software. In the illustrated implementation of FIG. 1, the shadow banning block 100 includes a voice recognition unit 110, a gaze tracking unit 120, a motion tracking unit 130, a behavior tracking unit 140, and a processor 150.

Initially, the processor 150 receives a target participant 152 identifying a possible griefer who may be shadow banned. In one implementation, the target participant 152 is reported by a participant in the social VR system who may have been grieved by the target participant 152. In another implementation, the target participant 152 may have been identified by the shadow banning block 100 from previous event(s) of the social VR system. The processor 150 then forwards the identity of the target participant 152 to at least one of the voice recognition is unit 110, the gaze tracking unit 120, the motion tracking unit 130, and the behavior tracking unit 140.

In the illustrated implementation of FIG. 1, the voice recognition unit 110 is configured to implicitly track the use of an inappropriate language including profanity, racial slurs, and other inappropriate languages such as rude comments. The gaze tracking unit 120 is configured to implicitly track the use of inappropriate gestures including inappropriate gaze, hand signs, and other inappropriate gestures such as disrespectful gestures. The motion tracking unit 130 is configured to implicitly track the use of inappropriate movements including standing too close, unwanted touching, and other inappropriate movements such as harassing movements. The behavior tracking unit 140 is configured to implicitly track the use of other inappropriate behaviors and responses including unwanted sexual behaviors/advances and responses from the people being grieved by the griefer(s). In one example, the responses of the people being grieved may include utterances such as "stop it," "what are you looking at," and "I am going to report you."

In one implementation, the processor 150 receives and processes inappropriate behaviors identified by the units 110, 120, 130, 140 at the end of an event. In another implementation, the processor 150 receives and processes inappropriate behaviors identified by the units 110, 120, 130, 140 in real-time. Once the identified inappropriate behaviors are received, the processor 150 processes and tracks the safety rating of the input target participant of the VR interactions based on the identified behavior of the participant.

In one implementation, the participant is scored for each event based on inappropriate behaviors of the participant or explicit response from the person being harassed or grieved. For example, the participant may be assessed 1 point for staring at other participant's anatomy, but may be assessed 10 points for groping. In another example, the use of foul language may add 5 points, while the use of racial slur may add 20 points to the participant's score. At the end of each event, the participant's total score may be added to the safety rating of the participant (e.g., total score for all events) and compared against a threshold.

In one implementation, once the total score or the safety rating of the participant passes a threshold at the end of the event, the processor generates a signal 154 to shadow ban the target participant. In other implementations, the processor generates the signal 154 to shadow ban the target participant immediately upon reaching the threshold without waiting until the end of the event.

In one implementation, the processor 150 applies the shadow banning of the griefer to a particular person (e.g., if the griefing has been directed against to that particular person) or to a group of people (e.g., if the griefing has been directed against the group or the griefing was so severe that it affected people other than the particular person such as for groping which can be seen by other people in the event). The application of shadow banning a griefer to a group of people means that the griefer does not appear to the group of people such that is although the griefer believes he or she is interacting with the group of people, the group of people does not interact with the griefer because they cannot see or hear the griefer. In other implementations, even if the griefing was against only one person, the processor 150 applies the shadow banning of the griefer to everyone in an event, if the safety rating of the griefer is relatively high (e.g., double the threshold).

In one implementation, the shadow banning block 100 also includes an agent input unit 160 which monitors the social VR system to determine whether the safety rating has been correctly applied or has not been abused. To do this, the agent input unit 160 receives the data from all of the recognition and tracking units 110, 120, 130, 140 as well as the safety rating determined by the processor 150. The agent input unit then assesses the safety rating based on the input from the recognition and tracking units 110, 120, 130, 140 and its own observation made in the social VR system so that the agent input unit 160 may act as a "judge" when the griefer or the person being grieved appeals the assessed scores.

In a further implementation, the processor 150 receives and processes inappropriate behaviors (of a target participant who is a possible griefer) identified by the units 110, 120, 130, 140 to determine the identity of the griefer. That is, the processor 150 processes the input data from the units 110, 120, 130, 140 to determine whether the target participant is a same griefer from previous event(s) who has taken an evasive action by logging in as another person. This can be done by evaluating the pattern of inappropriate behaviors and comparing the IP address or identity of the machine used to log into the social VR system with those of the previous griefer. As stated before, in one implementation, the identity of the machine includes an identifier for the machine such as the head-mounted display.

Another implementation involves a concept of paroling a griefer once the griefer has paid the debt to the virtual-world's society (i.e., un-banning the griefer after a cool-off period). The concept may also include an additional heuristic based on the concept of a griefer being on probation after the griefer is allowed to return to the VR social world. A probationary period of a griefer may extend for a finite amount of time (e.g., one week) in which the griefer may be cleared and fully reinstated as a VR citizen, if the griefer had no further incidents during the probationary period. However, while under probation, the thresholds for triggering a shadow ban may be designed differently (e.g., a lower numerical value for the threshold) to more closely monitor the griefer. Any subsequent violation of a probationary state can be grounds for permanent banning of the console, account or HMD from entering the VR social world again.

Figure 2:
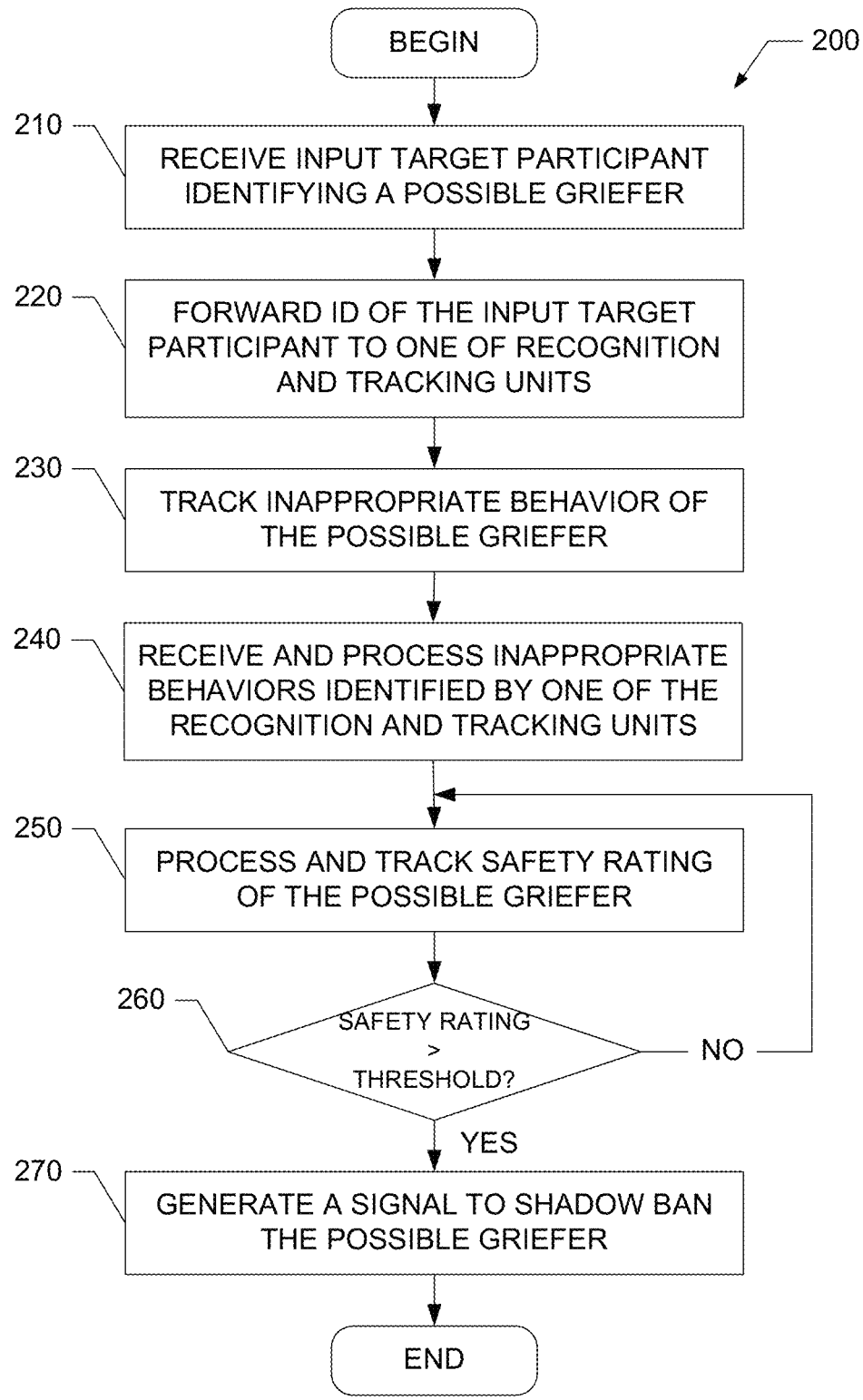
FIG. 2 is a flow diagram illustrating a process of shadow banning within the social VR system in accordance with one implementation of the present disclosure.

FIG. 2 is a flow diagram illustrating a process 200 of shadow banning within the social VR system in accordance with one implementation of the present disclosure. Initially, a target participant is received, at block 210, identifying a possible griefer who may be shadow banned. The identity of the target participant is forwarded, at block 220, to at least one of the voice recognition unit, the gaze tracking unit, the motion tracking unit, and the behavior tracking unit.

The inappropriate behavior of the possible griefer is then tracked, at block 230. In one implementation, the tracking of the inappropriate behavior includes: an inappropriate language including profanity, racial slurs, and other inappropriate languages such as rude comments is performed by the voice recognition unit; inappropriate gestures including inappropriate gaze, hand signs, and other inappropriate gestures such as disrespectful gestures is performed by the gaze tracking unit; inappropriate movements including standing too close, unwanted touching, and other inappropriate movements such as harassing movements is performed by the motion tracking unit; and inappropriate behaviors and responses including unwanted sexual behaviors/advances and responses from the people being grieved by the griefer(s). The inappropriate behaviors identified by the recognition and tracking units are received and processed, at block 240, in real-time or at the end of an event. In other implementations, the processing can be done after a fixed number of events have ended.

Once the identified inappropriate behaviors are received, the safety rating of the input target participant of the VR interactions is processed and tracked, at block 250, based on the identified behavior of the participant. In one implementation, the participant is scored for each event based on inappropriate behaviors of the participant or explicit response from the person being harassed or grieved. For example, the participant may be assessed 1 point for staring at other participant's anatomy, but may be assessed 10 points for groping. In another example, the use of foul language may add 5 points, while the use of racial slur may add 20 points to the participant's score.

The participant's total score may be added to the safety rating of the participant and compared against a threshold, at block 260. Once the total score or the safety rating of the participant passes the threshold, a signal to shadow ban the participant is generated, at block 270. Otherwise, the process reverts back to block 250 to process and track the safety rating of the possible griefer.

In one implementation, the shadow banning of the griefer is applied to a particular person (e.g., if the griefing has been directed against that particular person) or to a group of people (e.g., if the griefing has been directed against the group or the griefing was so severe that it affected people other than the particular person). In other implementations, even if the griefing was against only one person, the shadow banning of the griefer is applied to everyone in an event, if the safety rating of the griefer is relatively high (e.g., double the threshold).

Figure 3:
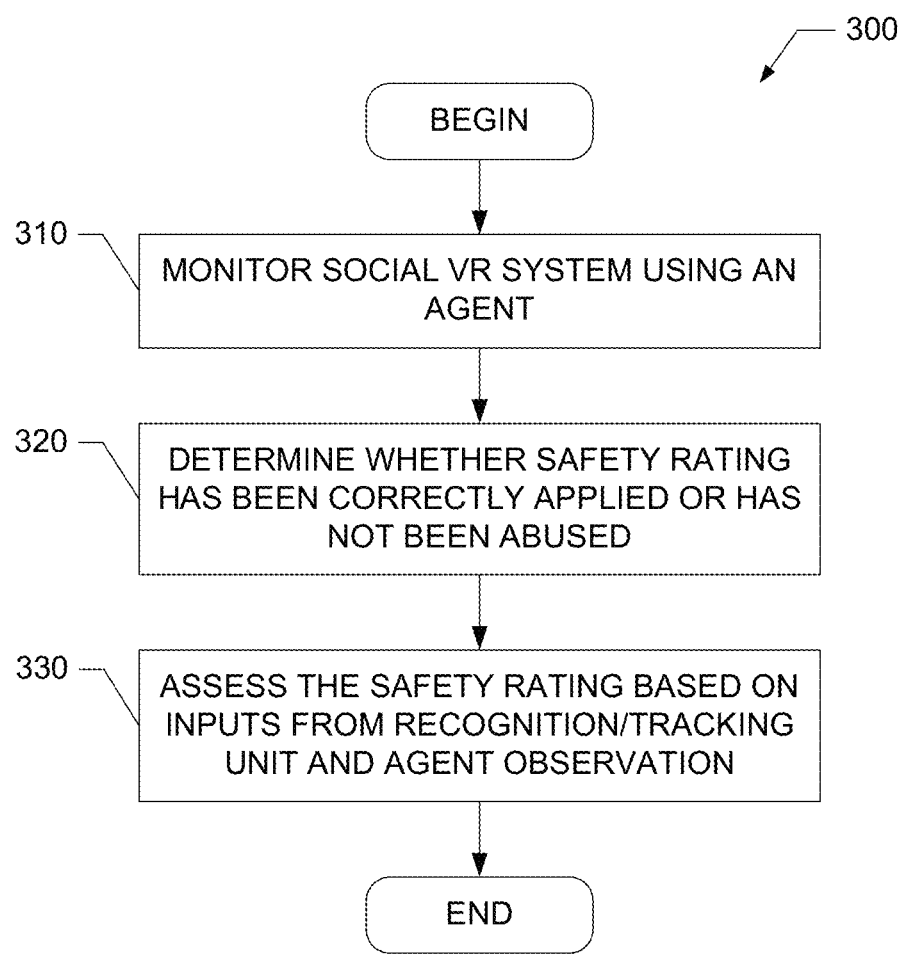
FIG. 3 is a flow diagram illustrating a process of shadow banning within the social VR system in accordance with a further implementation of the present disclosure.

FIG. 3 is a flow diagram illustrating a process 300 of shadow banning within the social VR system in accordance with a further implementation of the present disclosure. In the illustrated implementation of FIG. 3, the process 300 of shadow banning within the social VR system also includes monitoring the social VR system using an agent, at block 310. In one implementation, the agent is placed within the social VR system to determine whether the safety rating has been correctly applied or has not been abused, at block 320. To do this, the agent receives the data from all of the recognition and tracking units as well as the determined safety rating and assesses the safety rating, at block 330, based on the input from the recognition and tracking units and its own observation made in the social VR system so that the agent may act as a "judge" when the griefer or the person being grieved appeals the assessed scores. The agent may also discourage the participants from using the false reporting of griefing as a tool for vendetta or attacking an opponent or group of opponents within the social VR setting.

Figure 4A:
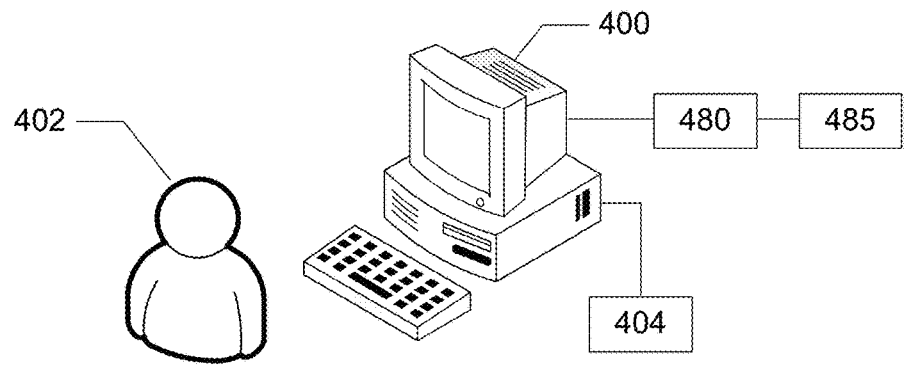
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement shadow banning within the social VR system. The computer system 400 stores and executes a shadow banning application 490 of FIG. 4B. In addition, the computer system 400 may be in communication with a software program 404. Software program 404 may include the software code for the social VR system. Software program 404 may be loaded on an external medium such as a CD, DVD, or a storage drive, as will be explained further below.

Furthermore, computer system 400 may be connected to a network 480. The network 480 can be connected in various different architectures, for example, a Client Server architecture, a Peer-to-Peer network architecture, or other type of architectures. For example, network 480 can be in communication with a server 485 that coordinates events within the social VR system. Also, the is network can be different types of networks. For example, the network 480 can be the Internet, a Local Area Network or any variations of Local Area Network, a Wide Area Network, a Metropolitan Area Network, an Intranet or Extranet, or a wireless network. Also, the term "event" can be used to identify any network topology where different users are connected to a network and to send and receive information from other users connected to the network.

Figure 4B:
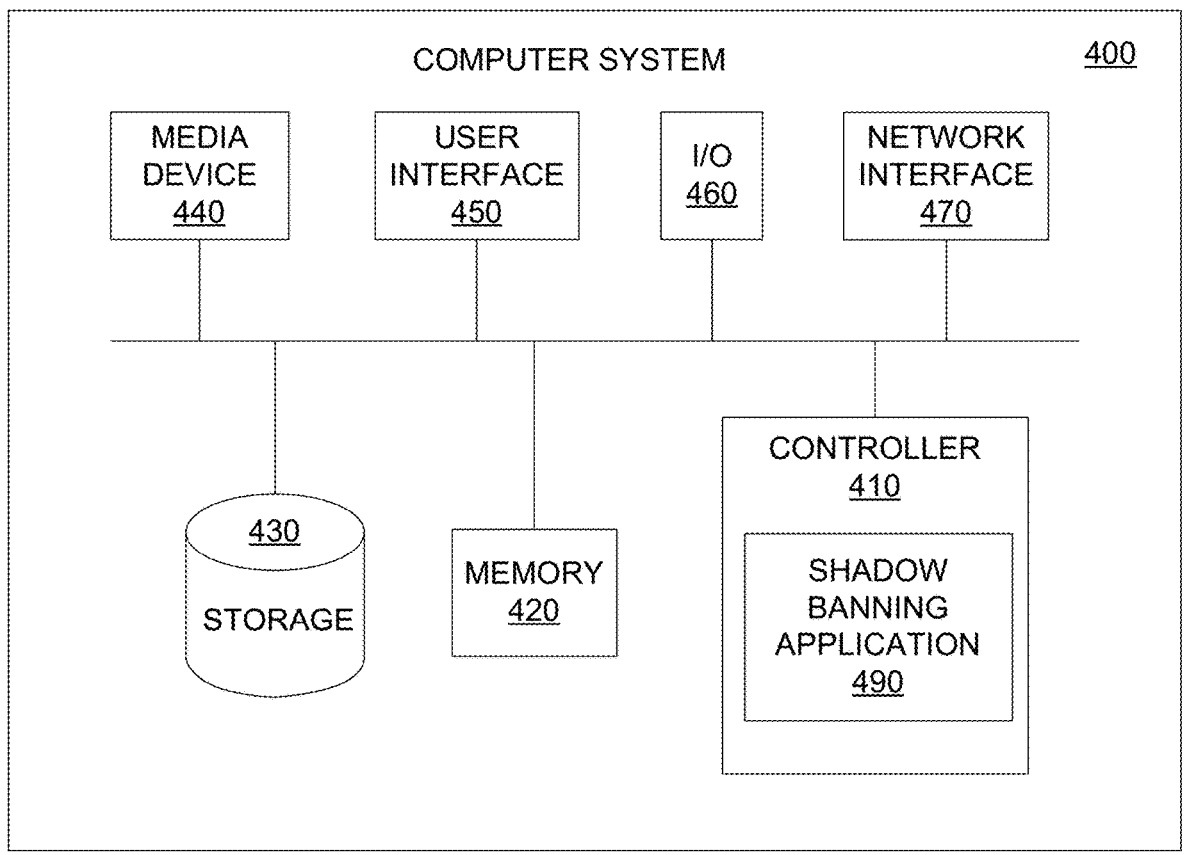
FIG. 4B is a functional block diagram illustrating the computer system hosting the shadow banning application in accordance with an implementation of the present disclosure.

FIG. 4B is a functional block diagram illustrating the computer system 400 hosting the shadow banning application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the shadow banning application 490 with a software system, such as to enable the creation and configuration of events within social VR systems and interactions. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of computer system 400. For example, storage 430 stores data used by the shadow banning application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless to interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software is typical of computer systems (e.g., power, cooling, operating system), though these components are not specifically shown in FIG. 4B for simplicity. In other implementations, different configurations of the computer system can be used (e.g., different bus or storage configurations or a multi-processor configuration). In one implementation, the computer system is a next generation game console from, for example, Sony Playstation® VR.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although the specification describes the shadow banning application in the social VR settings, the application can be used with any VR settings including VR games. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application-specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for shadow banning a participant within a social VR game, the method comprising:

receiving and forwarding, by a server processor, an identity of the participant, who may be shadow banned as a griefer within the social VR game, to a game processor;

recognizing and tracking, by the game processor, inappropriate behaviors of the participant as being perceived by other participants within the social VR game, wherein the inappropriate behaviors include inappropriate language and comments, inappropriate gestures, and inappropriate movements as perceived by the other participants being grieved by the griefer;

receiving and processing, by the server processor, the recognized and tracked inappropriate behaviors of the participant from the game processor;

generating, by the server processor, a safety rating based on the processed inappropriate behaviors;

comparing, by the server processor, the safety rating to a threshold value;

outputting, by the server processor to the game processor, a signal to label the participant as the griefer; and shadow banning the griefer when the safety rating is greater than the threshold value by processing an avatar of the griefer to not appear to the other participants so that the other participants do not interact with the griefer within the social VR game.

2. The method of claim 1, wherein the social VR game comprises at least one event in the social VR game and wherein comparing, by the server processor, the safety rating is done after each event of the at least one event.

3. The method of claim 1, wherein recognizing and tracking inappropriate behaviors, by the game processor, further comprises tracking responses of the other participants being grieved by one reported as the griefer.

4. The method of claim 1, wherein the generating, by the server processor, the safety rating based on the processed inappropriate behaviors includes scoring, by the server processor, each inappropriate behavior and aggregating scores of all inappropriate behaviors to generate the safety rating.

5. The method of claim 1, wherein the shadow banning of the griefer is applied to a particular participant to whom the griefer had directed the inappropriate behaviors.

6. The method of claim 1, further comprising immediately applying the shadow banning of the griefer when the safety rating is determined to be more than double the threshold value.

7. The method of claim 1, wherein processing the avatar of the griefer to not appear to the other participants comprises processing the avatar of the griefer to be at least one of invisible, inaudible, and not sensible in the social VR game.

8. A system for shadow banning a target participant within a social VR game, the system comprising:

a game processor configured to recognize and track inappropriate behaviors of the target participant as being perceived by other participants within the social VR game, wherein the inappropriate behaviors include inappropriate language and comments, inappropriate gestures, and inappropriate movements as perceived by the other participants being grieved by the target participant;

a server processor configured to receive and forward an identity of the target participant, who may be shadow banned, to the game processor, the server processor also configured to receive and process the recognized and tracked inappropriate behaviors of the target participant, the server processor further configured to generate a safety rating based on the processed inappropriate behaviors, compare the safety rating to a threshold value, output a signal to label the target participant as a griefer, and shadow ban the griefer when the safety rating is greater than the threshold value by processing an avatar of the griefer to not appear to the other participants so that the other participants do not interact with the griefer within the social VR game.

9. The system of claim 8, wherein the game processor includes at least one of a voice recognition unit, a gaze tracking unit, a motion tracking unit, and a behavior tracking unit.

10. The system of claim 9, wherein the voice recognition unit is configured to track any inappropriate language used by one reported as the griefer including profanity, racial slurs, and rude comments.

11. The system of claim 9, wherein the gaze tracking unit is configured to track inappropriate gestures made by one reported as the griefer including inappropriate gaze, hand signs, and disrespectful gestures.

12. The system of claim 9, wherein the motion tracking unit is configured to track inappropriate movements made by one reported as the griefer including standing too close, unwanted touching, and harassing movements.

13. The system of claim 9, wherein the behavior tracking unit is configured to track inappropriate behaviors made by one reported as the griefer including unwanted sexual behaviors and advances, the behavior tracking unit also configured to track responses from people being grieved by the griefer.

14. The system of claim 8, further comprising an agent input unit configured to monitor the social VR game to determine whether the safety rating has been correctly applied.

15. The system of claim 8, wherein processing the avatar of the griefer to not appear to the other participants comprises processing the avatar of the griefer to be at least one of invisible, inaudible, and not sensible in the social VR game.

16. A non-transitory computer-readable storage medium storing a computer program to shadow ban a participant within a social VR game, the computer program comprising executable instructions that cause a computer to:

receive and forward an identity of the participant, who may be shadow banned as a griefer within the social VR game;

recognize and track inappropriate behaviors of the participant as being perceived by other participants within the social VR game, wherein the inappropriate behaviors include inappropriate language and comments, inappropriate gestures, and inappropriate movements as perceived by the other participants being grieved by the griefer;

receive and process the recognized and tracked inappropriate behaviors of the participant;

generate a safety rating based on the processed inappropriate behaviors;

compare the safety rating to a threshold value;

output a signal to label the participant as the griefer, and shadow ban the griefer when the safety rating is greater than the threshold value by processing an avatar of the griefer to not appear to the other participants so that the other participants do not interact with the griefer within the social VR game.

17. The non-transitory computer-readable storage medium of claim 16, wherein the executable instructions that cause the computer to recognize and track inappropriate behaviors further comprises executable instructions that cause the computer to track responses of the other participants being grieved by one reported as the griefer.

18. The non-transitory computer-readable storage medium of claim 16, wherein the executable instructions that cause the computer to generate the safety rating based on the processed inappropriate behaviors includes executable instructions that cause the computer to score each inappropriate behavior and aggregate the inappropriate behaviors to generate the safety rating.

19. The non-transitory computer-readable storage medium of claim 16, wherein the executable instructions that cause the computer to shadow ban the griefer by processing an avatar of the griefer to not appear to the other participants comprise executable instructions that cause the computer to shadow ban the griefer by processing the avatar of the griefer to be at least one of invisible, inaudible, and not sensible in the social VR game.

* * * * *